United States Patent [19]
Elfes et al.

[11] 3,975,970
[45] Aug. 24, 1976

[54] MULTI THROW SELECTOR MECHANISM USING PIVOTED LINKS

[75] Inventors: Lee Eugene Elfes, Bloomfield Hills; Joseph William Beckerman, Livonia, both of Mich.

[73] Assignee: Massey-Ferguson Inc., Detroit, Mich.

[22] Filed: May 14, 1975

[21] Appl. No.: 577,488

[52] U.S. Cl. .............................................. 74/473 R
[51] Int. Cl.² ........................................ G05G 9/18
[58] Field of Search .......... 74/473 R, 473 SW, 475, 74/476, 477

[56] References Cited
UNITED STATES PATENTS

| | | | |
|---|---|---|---|
| 2,547,317 | 4/1951 | Gustafson | 74/473 R |
| 3,417,634 | 12/1968 | Dangauthier | 74/473 R |
| 3,757,598 | 9/1973 | Van Dest | 74/473 R |
| 3,805,635 | 4/1974 | Grosseau | 74/473 R |

*Primary Examiner*—Allan D. Herrmann
*Attorney, Agent, or Firm*—William R. Nolte

[57] ABSTRACT

This specification describes a multiple throw selector apparatus for use in change speed gearing which includes speed ratio shift rails to engage synchronized clutches and a range lever which engages an unsynchronized clutch. The range shift rail is moved between its various operative positions directly by a selector member. The ratio shift rails are actuated by the selector member through a pivoted link thereby increasing mechanism advantage between control lever and ratio shift rails.

4 Claims, 3 Drawing Figures

MULTI THROW SELECTOR MECHANISM USING PIVOTED LINKS

This invention relates to operating mechanisms for use with change speed gearing.

It is well-known in such gearing to select gear ratios by means of clutches which may be engaged by movement of shift rails. It is also known to utilize synchromesh devices in the clutches which ensure that the gear and the shaft to which it is to be clutched are rotating at the same speed. However, due to the nature of a synchronizing device, often a greater force is required to engage gears employing synchromesh devices than those without. Further, with a transmission employing both synchromesh and non-synchromesh clutches which are operated by a common control device, the force required to engage different gears can vary.

The present invention provides means for varying the mechanical advantage between the manual shift lever and the selector rails of such a transmission so that for the unsynchronized clutches there is a relatively low mechanical advantage, whereas for the synchronized clutches there is a relatively high mechanical advantage.

It is contemplated, for example, that a transmission employing such a device would have a plurality of synchronized clutches for engaging different speed ratios and an unsynchronized clutch for engaging a range gear to provide a high and low range in each speed ratio.

An embodiment of the invention will now be described by way of example only, with reference to the accompanying drawings, in which.

Figure 1:
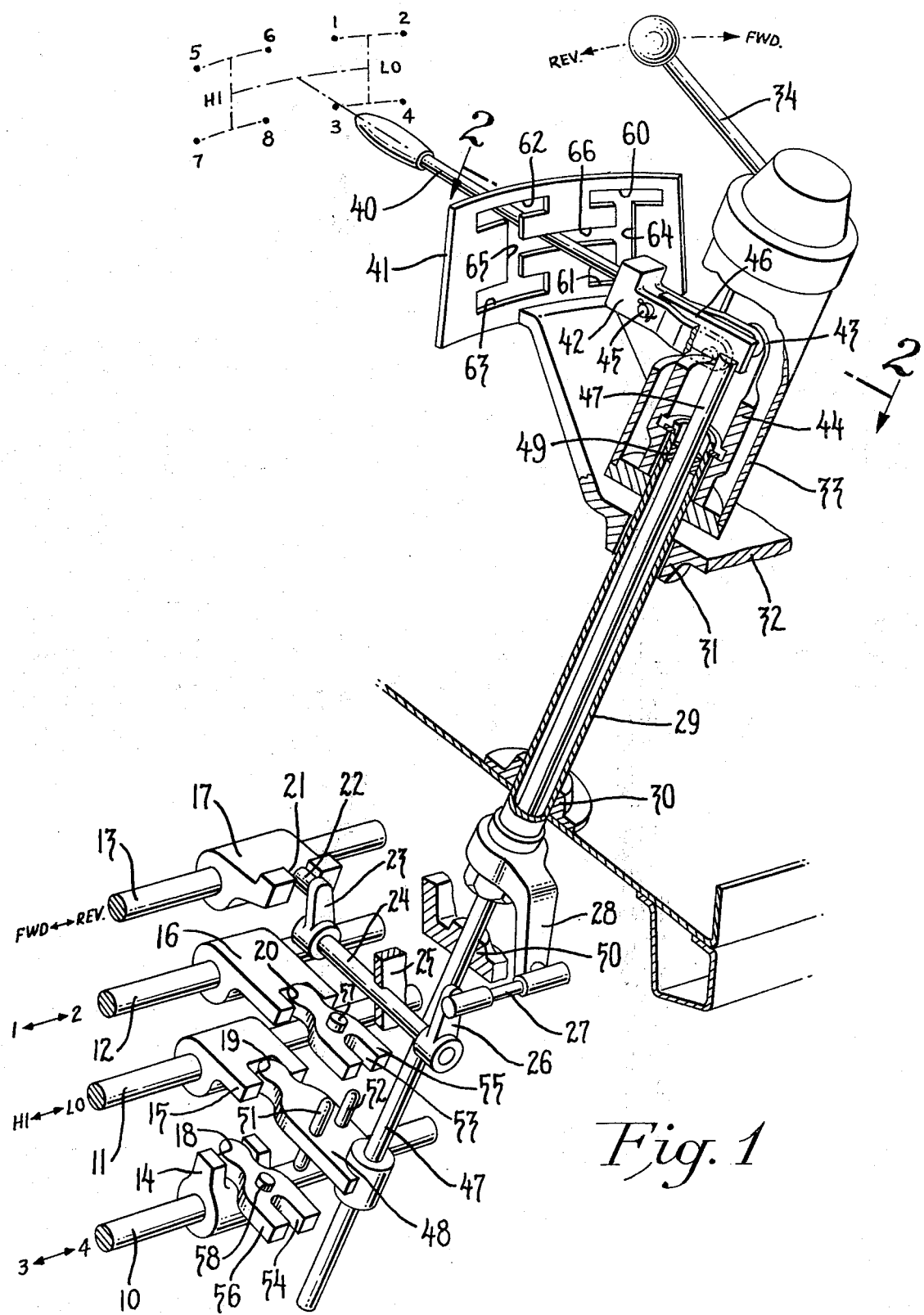
FIG. 1 shows a perspective view partly cut away of a transmission operating mechanism.
Figure 2:
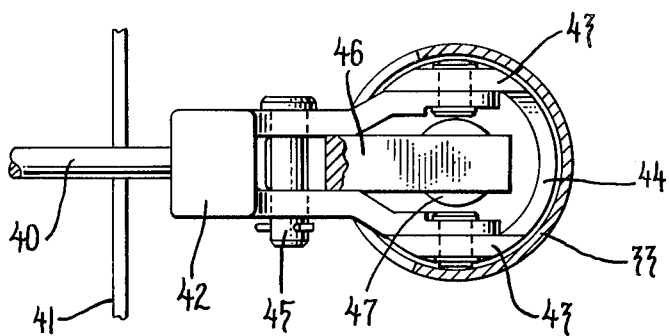
FIG. 2 is a view along the line 2 — 2 of FIG. 1.
Figure 3:
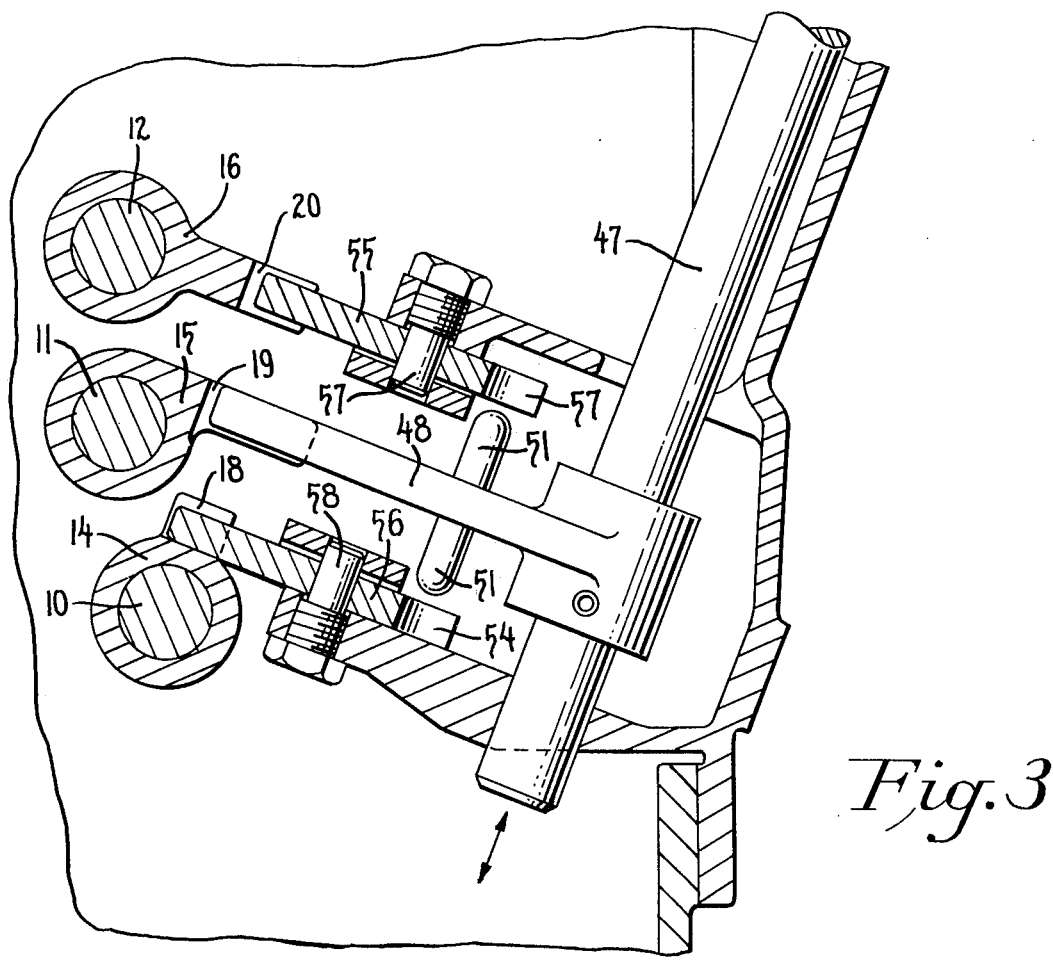
FIG. 3 is an enlarged sectional side view of a portion of FIG. 1.

Referring now to FIG. 1, a change speed transmission is provided with four shift rails 10, 11, 12, and 13 which are selectively operable to select different speed ratios in the transmission in any known manner.

Shift rail 10 engages third and fourth speed ratios, shift rail 11 engages a high and low ratio range gear, shift rail 12 engages first and second gear ratios and shift rail 13 selects drive direction between forward and reverse.

Each of the shift rails 10 – 13 are provided with selector forks 14 – 17, respectively, which are fixed to the shift rails. The selector forks have notches 18 – 21, respectively. A pin 22 is mounted on a crank 23 and engages the notch 21. The crank 23 is connected to a rod 24 which is rotatably mounted in the transmission casing 25 and has a lever 26 connected to the end opposite the crank 23.

The lever 26 is connected by a link 27 to an arm 28 which is fixedly connected to a tubular column 29. The tubular column 29 is rotatably supported at spaced points 30, 31 in support structure 32.

The upper end of the tubular column 29 is connected to a cylinder 33 on which is mounted a direction control lever 34. Thus, movement of the direction control lever 34 will rotate the cylinder 33 and tubular column 29 and move the arm 28. The movement of the arm 28 is transmitted through the link 27 to rotate the rod 24 and the crank 23 to move the shift rails 13 back or forth between reverse or forward drive position respectively.

Speed ratios are selected by a ratio selection lever 40 which passes through a slotted gate 41 and is connected to a yoke 42. The yoke 42 is pivotally mounted to ears 43 on a housing 44 rotatably connected to an extension of the tubular column 29. Part of the surface of the cylinder 33 is cut away to allow the yoke to pass through. The yoke 42 carries a pin 45 which is engaged by a slotted member 46 connected to a rod 47. The rod 47 extends through the tubular column 29 and has a finger or link 48 attached to one end. Bearings 49, 50 rotatably support the rod 47 in the tubular column 29.

The finger 48 is engageable with the notch 19 and has two pins 51, 52 projecting on either side. The pins are engageable with slots 53, 54 formed in upper and lower pivoted links 55, 56, respectively.

The upper pivoted link 55 engages the notch 20 and is pivotally mounted on the transmission case by a pin 57. The lower pivoted link 56 engages the notch 18 and is pivotally mounted on the transmission case by a pin 58.

The slotted gate 41 is formed with four horizontally extending slots 60, 61, 62, 63 pairs of which are connected by vertical slots 64, 65. The vertical slots 64, 65 are interconnected by a horizontal slot 66. Movement of the ratio selection lever 40 along the horizontally extending slots 60 – 63 and 66 rotates the yoke 42 and housing 44 and causes the rod 47 to be rotated. Rotation of the rod 47 causes the finger or crank 48 to oscillate in a direction to move the shift rails 10 – 12. Movement of the selector lever 40 along the vertical slots 64, 65 will cause the rod 47 to move axially along the tubular column 29 to move the link finger 48 vertically.

With the selector lever 40 in the position shown, i.e., in the horizontal slot 66, the finger 48 is engaged with the notch 19 and movement along the horizontal slot 66 toward the vertical slot 64 will move the shift rail 11 to engage the low gear range. Vertical movement of the selector lever 40 along the vertical slot 64 toward the horizontally extending slot 60 moves the pin 51 into engagement with the slot 53 and disengages the finger 48 from the notch 19. Movement of the lever along the horizontally extending slot 60 causes pin 51 to rotate the pivoted link 55 about the bolt 57 and move the selector rod to engage first or second gear ratio.

Similarly, if the selector lever 40 is moved along vertical slot 64 toward horizontally extending slot 61, the pin 51 engages the slot 54 and movement along the horizontally extending slot 61 will rotate the link 56 and cause the shift rail 10 to move axially to engage third or fourth gear ratio.

If the selector lever 40 is moved along the horizontal slot 66 toward the vertical slot 65, the shift rail 11 is moved to engage a high range ratio and the pin 52 is aligned with the slots 53 and 54 to allow selection of the speed ratios in the high range.

It will be apparent that the pivoted links 55, 56 increase the mechanical advantage between the selector lever 40 and the shift rails 10, and 12 so that the higher resistance encountered by the shift rails in engaging gear due to the synchromesh devices does not lead to a higher force in the selector lever 40 than is required to engage the gear connected to the shift rail 11.

We claim:

1. In a transmission providing a plurality of speed ratios and having a plurality of shift rails for selectively engaging said speed ratios, and operating mechanism comprising manual control lever, and a first link connected to said control lever and operatively associable with one of said shift rails to selectively move the same, the improvement comprising a second link pivotally mounted intermediate its ends operatively associable with another of said shift rails, with said first link being selectively engageable with said second link to effect movement of the latter link and the shift rail associated with said second link.

2. The mechanism of claim 1 wherein a further shift rail is provided and a third link pivotally mounted intermediate its ends is operatively associated therewith and is selectively engageable by said first link.

3. The mechanism of claim 1 wherein said control lever is connected to said first link by a rod whereby rotation of said rod causes movement of said shift rails and axial movement of said rod causes relative movement between said first and second links and wherein said first link is provided with a pin and said second link is provided with a slot, said pin engaging with the slot upon movement of said first link toward said second link.

4. The transmission of claim 3 including an additional shift rail for selecting drive direction between forward and reverse, a drive direction shift lever, a sleeve connected to said drive direction shift lever and supporting said rod for axial and rotational movement, and lever means operatively connected with said sleeve and said shift rail to effect its movement between forward and reverse positions.

* * * * *